United States Patent
Mishra et al.

(10) Patent No.: US 11,298,899 B2
(45) Date of Patent: Apr. 12, 2022

(54) SYSTEM AND METHOD FOR REPAIRING A COMPOSITE STRUCTURE

(71) Applicant: Bell Helicopter Textron Inc., Fort Worth, TX (US)

(72) Inventors: Suvankar Mishra, Carrollton, TX (US); Vance Newton Cribb, III, Aledo, TX (US)

(73) Assignee: Textron Innovations Inc., Providence, RI (US)

( * ) Notice: Subject to any disclaimer, the term of this patent is extended or adjusted under 35 U.S.C. 154(b) by 40 days.

(21) Appl. No.: 16/450,739

(22) Filed: Jun. 24, 2019

(65) Prior Publication Data

US 2020/0398507 A1    Dec. 24, 2020

(51) Int. Cl.
*B29C 73/02* (2006.01)
*B64F 5/40* (2017.01)
(Continued)

(52) U.S. Cl.
CPC ............ *B29C 73/025* (2013.01); *B29C 73/24* (2013.01); *B64C 11/26* (2013.01); *B64F 5/40* (2017.01);
(Continued)

(58) Field of Classification Search
CPC ........... B29L 2031/08; B29L 2031/082; B29L 2031/085; B29L 2031/608; Y10T 29/49476; B29C 44/00; B29C 44/18; B29C 44/186; B29C 44/188; B29C 65/00; B29C 65/48; B29C 65/483; B29C 65/484; B29C 65/52; B29C 65/54; B29C 65/542;
(Continued)

(56) References Cited

U.S. PATENT DOCUMENTS 3,695,778 A * 10/1972 Taylor ................. F01D 5/147
                                                   416/92
3,743,440 A *  7/1973 Moore .................. B64C 27/46
                                                   416/84
(Continued)

FOREIGN PATENT DOCUMENTS

| EP | 2902166 A1 | 8/2015 |
| EP | 3274159 A1 | 1/2018 |
| WO | 2018215449 A | 11/2018 |

OTHER PUBLICATIONS

European Search Report in related European Patent Application No. 20181700.4 dated Dec. 1, 2020, 4 pages.
(Continued)

*Primary Examiner* — Michael A Tolin
*Assistant Examiner* — Brian R Slawski
(74) *Attorney, Agent, or Firm* — Lightfoot & Alford PLLC

(57) ABSTRACT

A method of repairing a composite structure includes providing an assembled composite structure comprising a substantially rigid outer component, wherein the composite structure comprises a void space at least partially bounded by the outer component. The method further includes forming an injection hole through the outer component to provide a path between the void space and space external to the composite structure. The method further includes injecting foam into the void space through the injection hole while the foam is in a substantially unexpanded state and expanding the foam within the void space.

21 Claims, 16 Drawing Sheets

(51) Int. Cl.
    *B29C 73/24*         (2006.01)
    *B64C 11/26*         (2006.01)
    *B29L 31/08*         (2006.01)
    *B29C 44/18*         (2006.01)
    *B29C 65/54*         (2006.01)

(52) U.S. Cl.
    CPC ............ *B29C 44/18* (2013.01); *B29C 65/542* (2013.01); *B29L 2031/082* (2013.01); *B32B 2603/00* (2013.01)

(58) Field of Classification Search
    CPC ....... B29C 73/00; B29C 73/02; B29C 73/025; B32B 2603/00
    USPC ...... 156/60, 64, 77, 78, 79, 87, 94, 98, 153, 156/154, 278, 280, 281, 305; 29/402.01, 29/402.03, 401.04, 401.18; 428/71, 117, 428/304.4; 264/41, 45.1, 46.4, 46.6, 51, 264/54
    See application file for complete search history.

(56) References Cited

U.S. PATENT DOCUMENTS

| | | | | |
|---|---|---|---|---|
| 3,875,275 A | * | 4/1975 | Lemelson | B29C 33/046 264/45.3 |
| 4,033,023 A | * | 7/1977 | Slaughter | B63B 22/00 29/402.18 |
| 4,335,174 A | * | 6/1982 | Belko | B29C 63/0034 428/73 |
| 4,789,304 A | * | 12/1988 | Gustafson | F01D 5/288 416/95 |
| 5,683,636 A | * | 11/1997 | van der Spek | B29C 41/04 264/271.1 |
| 6,295,787 B1 | * | 10/2001 | Lee | B29C 44/581 220/592.01 |
| 9,015,941 B2 | | 4/2015 | Thiagarajan et al. | |
| 9,550,334 B2 | | 1/2017 | Mishra et al. | |
| 9,757,883 B2 | | 9/2017 | Hethcock et al. | |
| 9,868,233 B2 | | 1/2018 | Mishra et al. | |
| 2008/0063468 A1 | * | 3/2008 | Wernlund | F16B 7/18 403/230 |
| 2009/0184438 A1 | * | 7/2009 | Buzzi | B29C 44/186 264/254 |
| 2011/0223019 A1 | * | 9/2011 | Wan | F03D 80/55 416/1 |
| 2011/0225796 A1 | * | 9/2011 | Okutan | B29C 44/184 29/428 |
| 2012/0114497 A1 | * | 5/2012 | Petersen | F03D 1/0683 416/241 R |
| 2014/0120298 A1 | * | 5/2014 | Thiagarajan | B29C 73/06 428/99 |
| 2014/0271215 A1 | * | 9/2014 | Measom | F01D 5/282 416/224 |
| 2016/0303818 A1 | | 10/2016 | Thiagarajan et al. | |
| 2017/0029088 A1 | * | 2/2017 | Gruner | B32B 27/18 |
| 2019/0111528 A1 | * | 4/2019 | Ota | B29C 73/00 |

OTHER PUBLICATIONS

European Exam Report in related European Patent Application No. 20181700.4 dated Dec. 11, 2020, 6 pages.
European Exam Report in related European Patent Application No. 20181700.4 dated May 31, 2021, 4 pages.

* cited by examiner

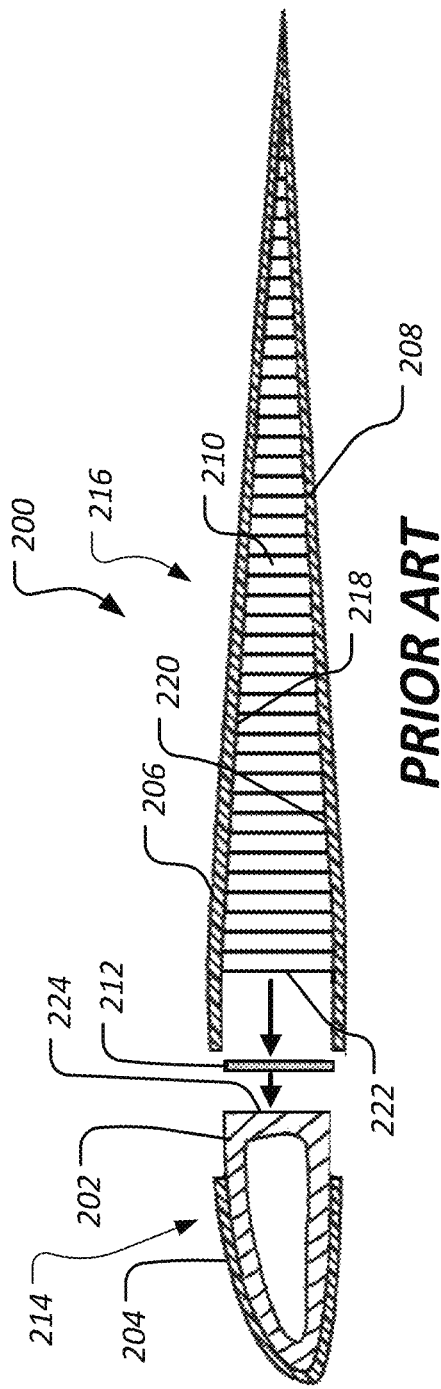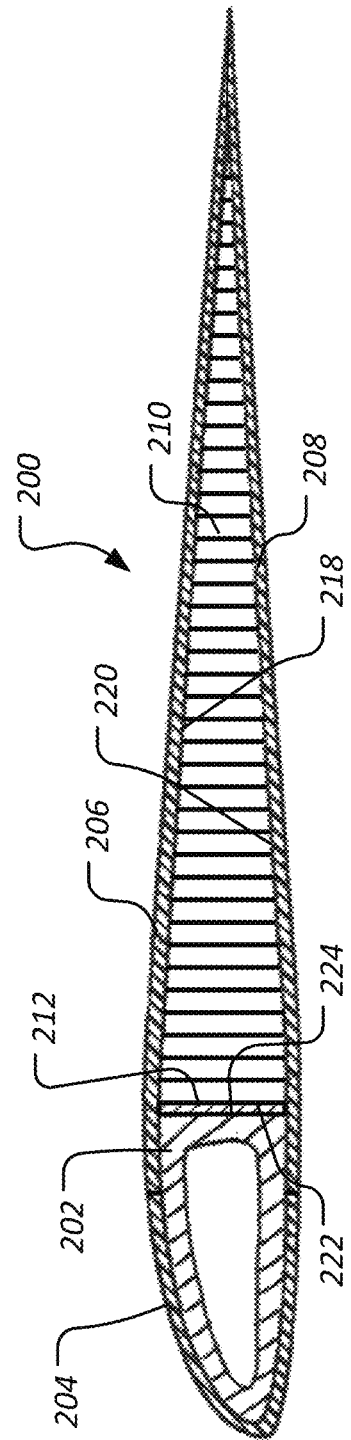

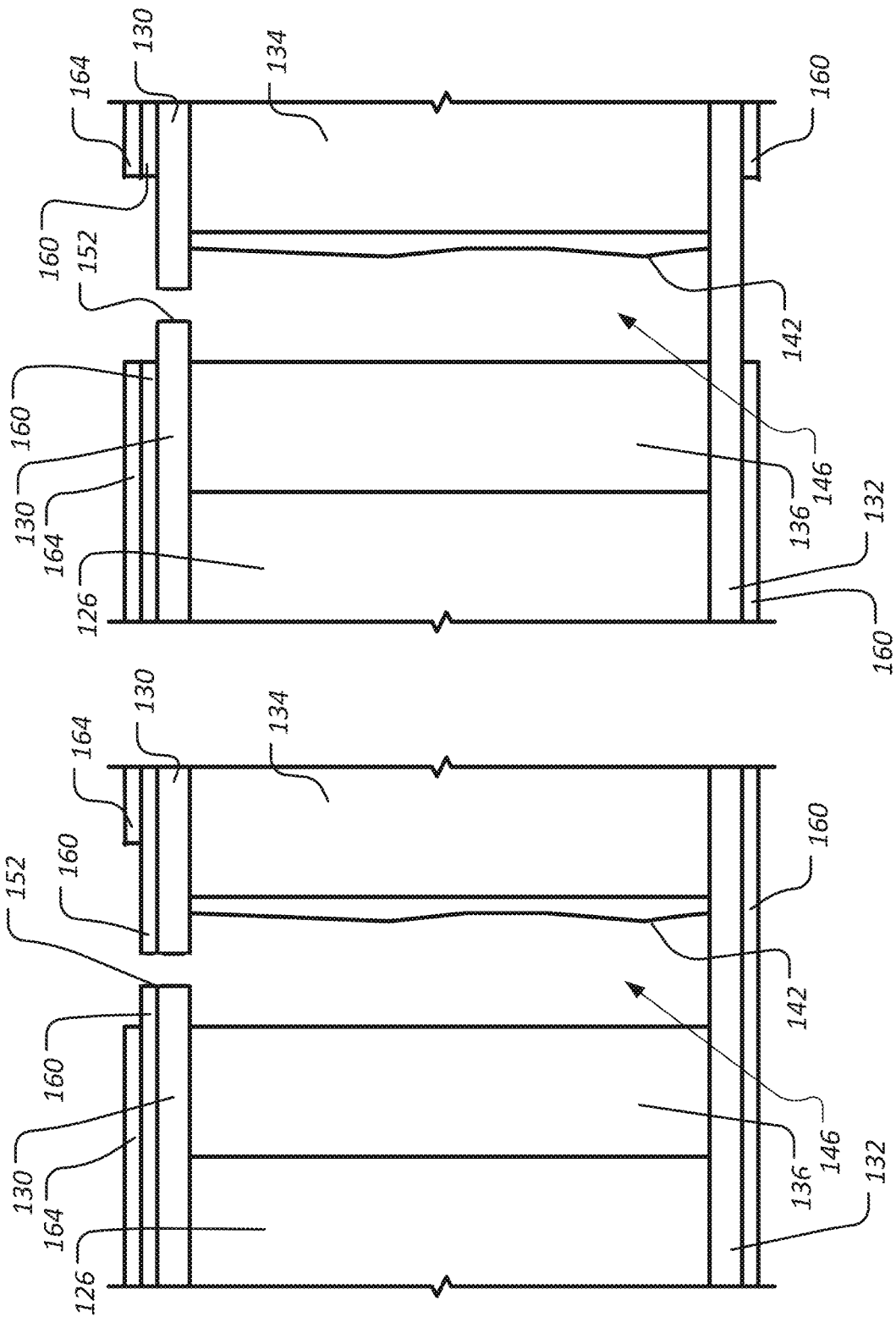

SYSTEM AND METHOD FOR REPAIRING A COMPOSITE STRUCTURE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Some composite structures are constructed using a plurality of pre-constructed subassemblies. In some cases, the dimensions of the subassemblies must conform to prescribed tolerances for the composite structure to perform in accordance with established performance guidelines. When a subassembly of a composite structure does not conform to prescribed tolerances, the behavior of the composite structure under loads may be unpredictable. It is not uncommon for a composite structure to be completely constructed and put into service with latent defects such as failures to conform to prescribed dimension tolerances. In some cases, such latent defects can result in the presence of a void between components that are intended to contact each other for the purpose of transferring forces between the two components. In such cases, forces applied to the defective composite structure may be transferred through force paths that were not intended during the design of the composite structure. Use of such unintended force paths may result in a variety of failures, including, but not limited to, immediate catastrophic destruction of the composite structure or an unpredictable fatigue failure of the composite structure. Accordingly, there is a need for systems and methods for efficiently and cost-effectively repairing defective composite structures.

BRIEF DESCRIPTION OF THE DRAWINGS

PRIOR ART FIG. 3 is a cross-sectional view of a prior art main rotor blade in an unassembled state.

PRIOR ART FIG. 4 is a cross-sectional view of the prior art main rotor blade of FIG. 3 in an assembled state.

FIG. 11 is a schematic partial cutaway view of the unrepaired main rotor blade showing masking tape and paint.

FIG. 12 is a schematic partial cutaway view of the unrepaired main rotor blade showing paint removed from both the upper skin and the lower skin.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges systems and methods for repairing enclosed composite structures. In particular, this disclosure divulges systems and methods for repairing substantially completely assembled rotor blades and rotor blades that have been placed in service. While this disclosure focuses primarily on the repair of rotor blades, substantially the same systems and methods disclosed herein may alternatively be utilized to repair other types of composite structures that may comprise undesirable void spaces or void spaces that do not meet predetermined design criteria of the composite structures.

Figure 1:
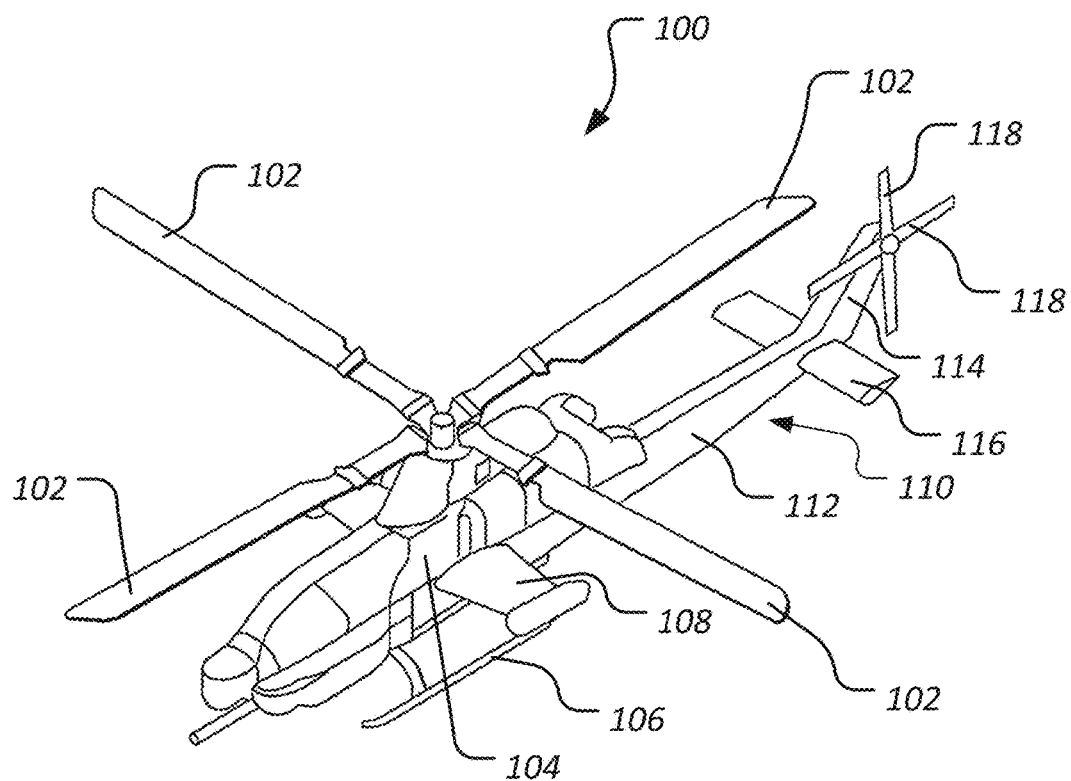
FIG. 1 is an oblique view of a helicopter comprising a main rotor blade according to this disclosure.

Referring to FIG. 1, helicopter 100 is illustrated. Helicopter 100 includes main rotor blades 102, a fuselage 104, a landing gear 106, and a wing 108. Helicopter 100 further includes a tail boom assembly 110, which is an assembly of a tail boom 112, a tail fin 114, an elevator 116, and tail rotor blades 118. Elevator 116 functions to provide pitch control during flight of helicopter 100. Main rotor blades 102 are illustrated and described herein as an embodiment of a foam repaired composite structure, having been repaired using and according to one or more of the systems and methods of repairing composite structures disclosed herein. Further, it should be appreciated that rotor blades 102 are simply one example of composite structure that can be manufactured in accordance with the method of the present application. For example, a variety of composite structures on a helicopter 100 can be manufactured in accordance with the systems and methods of the present application. For example, tail rotor blade 118, wing 108, tail boom 112, tail fin 114, elevator 116, and fuselage 104 can all include composite structures that may be repaired in accordance with the systems and methods of the present application. Furthermore, helicopter 100 is merely an example of a wide variety of vehicles and systems that have composite structures formed suitable for repair using the systems and methods disclosed herein. For example, other vehicles and systems include fixed wing aircraft, boats, ships, automobiles, skateboards, water sports boards, wind energy generation systems, and any other composite structure that can comprise an undesirable void space.

Figure 2:
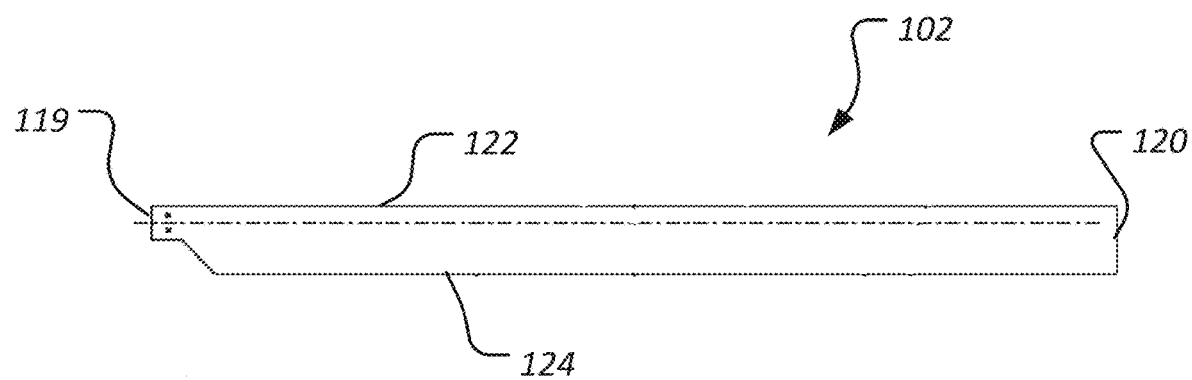
FIG. 2 is a top view of a main rotor blade of the helicopter of FIG. 1.

Referring now to FIG. 2, a top view of a main rotor blade 102 is shown. The main rotor blade 102 includes a root end 119, a tip end 120, a leading edge 122, and a trailing edge 124.

Referring now to Prior Art FIGS. 3 and 4, cross-sectional views of an unassembled prior art rotor blade 200 and an assembled prior art rotor blade 200 are shown. The prior art rotor blade 200 generally includes a lengthwise spar 202, a forward skin 204, an upper skin 206, a lower skin 208, a lightweight cellular structure, such as, but not limited to, a columnar honeycomb structure 210, and an expanding adhesive 212. In some cases, the prior art rotor blade 200 is constructed by producing a leading subassembly 214 comprising at least the spar 202 and the forward skin 204 and separately producing a trailing subassembly 216 comprising at least the upper skin 206, lower skin 208, and the honeycomb structure 210. In such construction methodologies, tolerances of the spar 202, forward skin 204, upper skin 206, and lower skin 208 may be easier to ensure conformity to prescribed dimensions as compared to ensuring conformity of the dimensions of the honeycomb structure 210 to within prescribe tolerances. Further, an upper interface profile 218 and a lower interface profile 220 may be more easily made to conform to prescribed dimensions than a forward interface profile 222 because cutting the honeycomb structure 210 in directions relatively more orthogonal to the columnar directions may benefit from the relatively stiffer response of the honeycomb structure to a cutting device that is simultaneously cutting many cellular columns as opposed to sequentially cutting through individual sidewalls of the cellular columns. In circumstances where dimensions of the honeycomb structure 210 are properly controlled, the rotor blade 200 can generally be constructed by applying the expanding adhesive 212 to a rear face 224 of the spar 202, bringing the forward interface profile 220 of the honeycomb structure 210 into contact with the expanding adhesive 212, and bringing the upper skin 206 and lower skin 208 into abutment or near abutment with each of the forward skin 204 and upper and lower sides of the spar 202, respectively. In cases where the skins 206, 208 do not abut the forward skin 204, adhesive or bonding material may be disposed therebetween. Similarly, in cases where the skins 206, 208 do not abut the spar 202, adhesive or bonding material may be disposed therebetween. Once assembled, the blade 200 can be cured by allowing time to elapse with or without the aide of externally applied heat and/or pressure. Ultimately, a cohesive structure is formed that among other things, utilizes the now hardened expanding adhesive 212 to rigidly bond the spar 202, the upper skin 206, the lower skin 208, and the forward interface profile 220 together into a load bearing force path capable of transmitting shear forces.

Figure 5A:
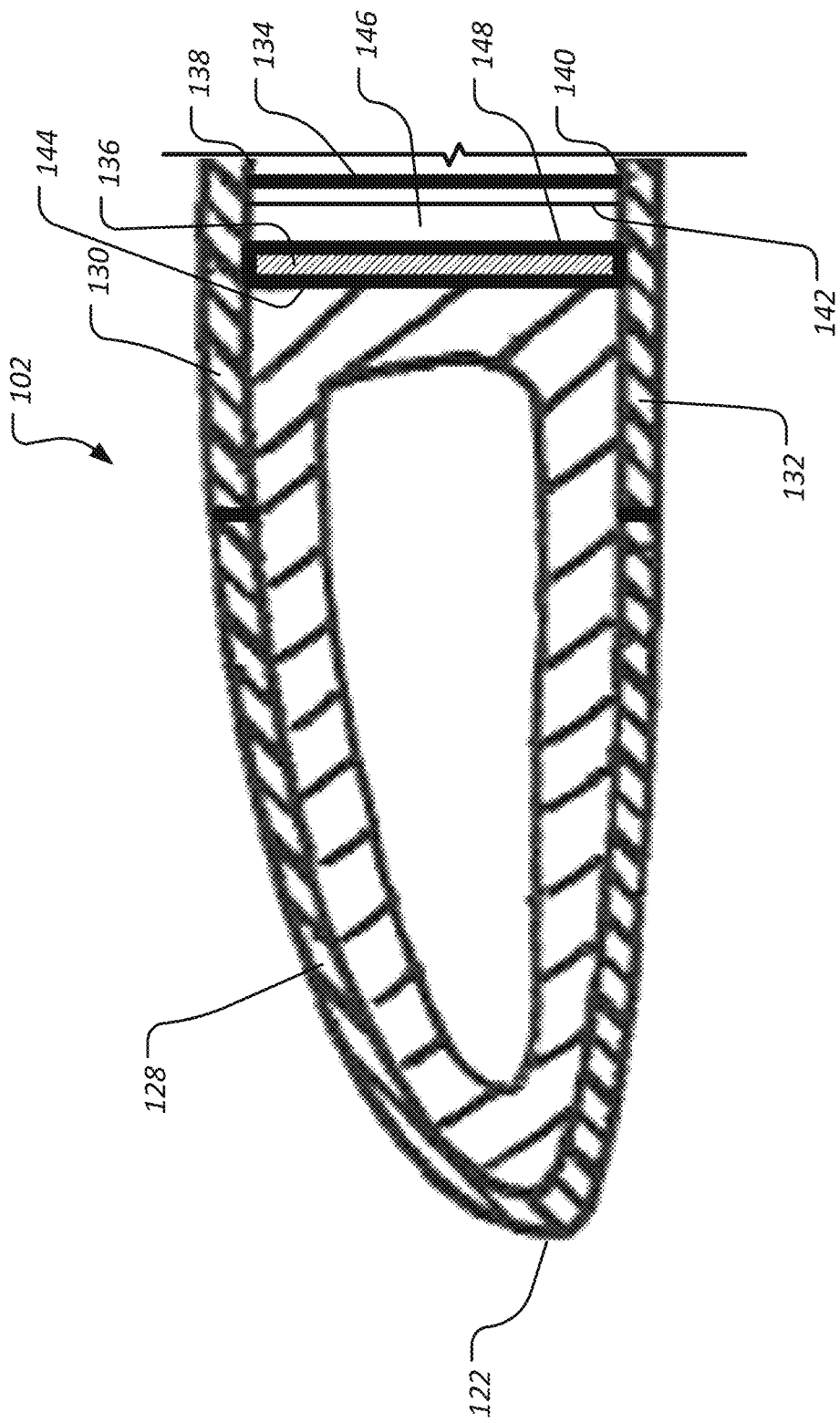
FIG. 5A is a partial cross-sectional view of the main rotor blade of FIG. 2 in an unrepaired state.

Referring now to FIG. 5A, a partial cross-sectional view of a rotor blade 102 prior to being repaired is shown. The rotor blade 102 is substantially similar to the prior art rotor blade 200 insofar as it comprises substantially the same components. The rotor blade 102 includes a lengthwise spar 126, a forward skin 128, an upper skin 130, a lower skin 132, a columnar honeycomb structure 134, expanding adhesive 136, upper interface profile 138, lower interface profile 140, forward interface profile 142, and a rear face 144. Although the unrepaired rotor blade 102 comprises substantially the same physical components, but additionally, an undesirable void space 146 located between at least the fully expanded and hardened expanding adhesive 136 and forward interface profile 142 of honeycomb structure 134 that does not conform to the original design requirements of the rotor blade 102. The void space 146 can be referred to has comprising a void boundary 148. The presence of the undesirable void space 146 is an example of a manufacturing defect of the rotor blade 102. Accordingly, at least where the shown cross-section is taken, the original design intent of the rotor blade of providing a force path for at least shear forces is not met due to the lack of structural connection between the expanding adhesive 136 and the honeycomb structure 134. It will be appreciated that the void space 146 and the associated void boundary can comprise substantially any shape and extend uniformly or irregularly in all three dimensions up to and including extending to the point of being bounded by the honeycomb structure 134, the expanding adhesive 136, the upper skin 130, the lower skin 132, and/or any longitudinal caps used to enclose the rotor blade 102 at the root end 119 or tip end 120, or any other structure used to encapsulate the void space 146.

Figure 5B:
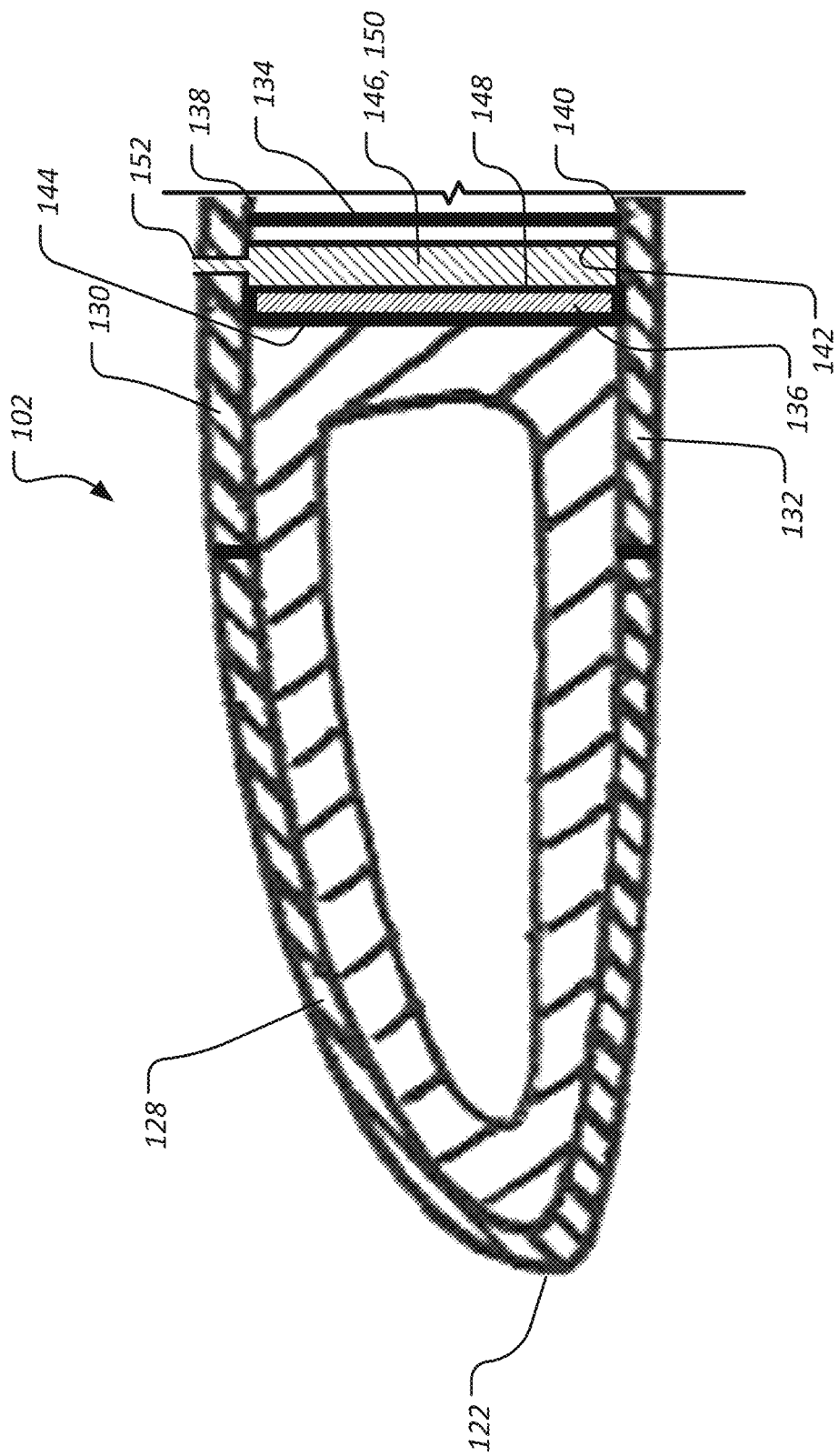
FIG. 5B is a partial cross-sectional view of the main rotor blade of FIG. 2 in a substantially repaired state.

Referring now to FIG. 5B, a partial cross-sectional view of a rotor blade 102 after being repaired is shown. The repaired rotor blade 102 is substantially similar to the unrepaired blade 102, however, rather than the void space 146 comprising no significant amount of material, the void space 146 is now substantially filled with expanded and cured foam 150. Further, an injection hole 152 formed through the upper skin 130 is filled with cured foam 150. The systems and methods for effectuating the shown repair is described in greater detail below.

Figure 6:
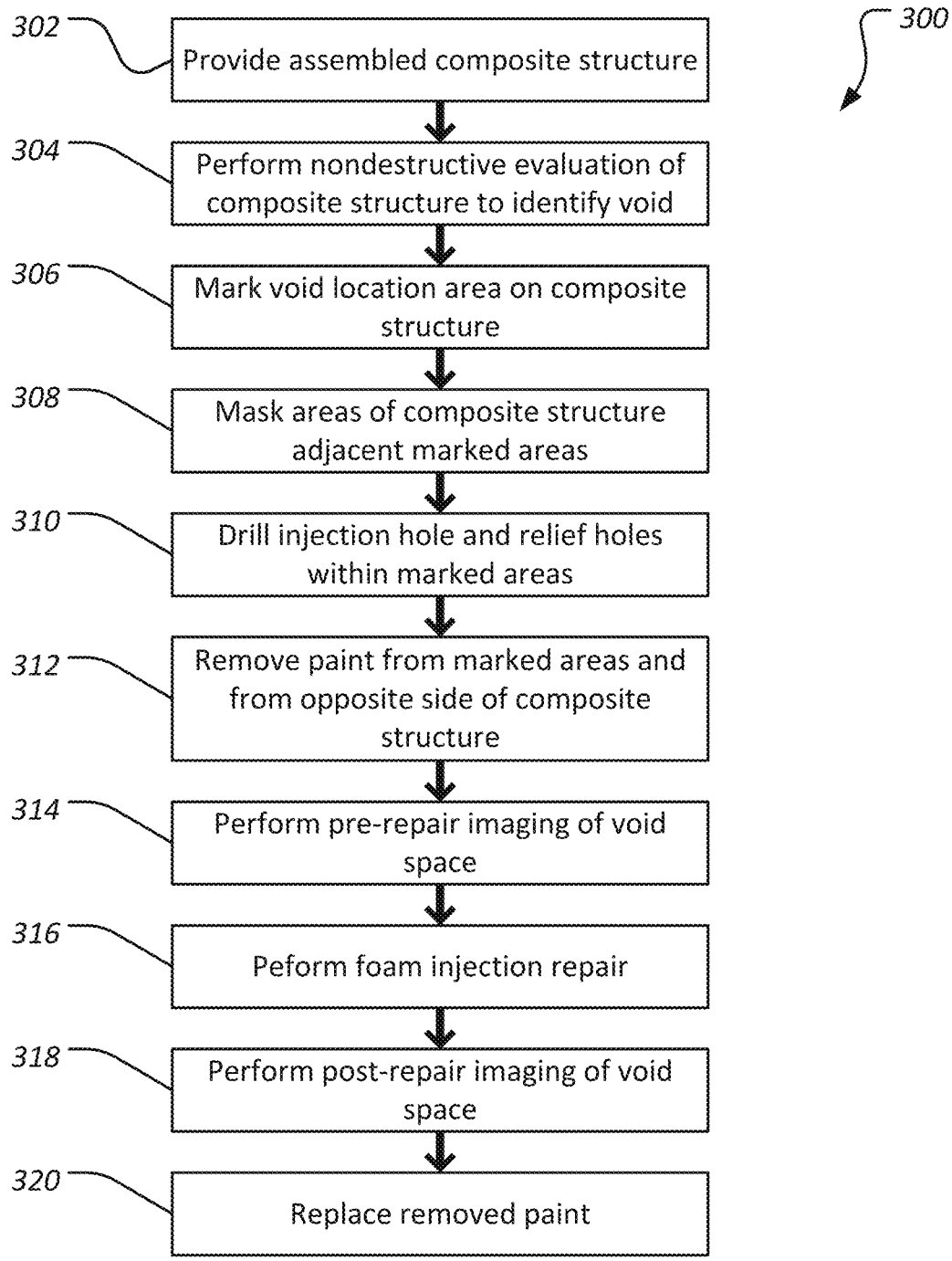
FIG. 6 is a flowchart of a method of repairing a composite structure.

Referring now to FIG. 6, a flowchart of a method 300 of repairing a composite structure is shown. Most generally, the method 300 describes an example process by which a defective composite structure can be remediated and repaired using a foam injection process and without requiring application of patches to the exterior skins of the composite structures. The method 300 explains the process in detail as related to applying the process to a main rotor blade, such as main rotor blade 102. However, it will be appreciated that the process can be generalized and applied to any other composite structure comprising an undesired void space, such as void space 146, the presence of which can undesirably alter an intended force transfer path of the composite structure. The method 300 will be described substantially in a particular order of steps, however, it will be appreciated that in alternative embodiments of the method, some steps may be taken in a different order while still enabling achievement of substantially similar results, namely, improving a structural load path through the void space.

The method 300 may begin at block 302 by providing an assembled composite structure. In some cases, the composite structure can be both assembled and already in service in the field, such as, but not limited to, a rotor blade 102 that was manufactured with an undesired void space 146 and placed into service on a helicopter. In other cases, an assembled composite structure can comprise a composite structure that is completely manufactured and ready for installation and use, but for undergoing a nondestructive evaluation to check for an undesirable void space. In both of the cases described above, the presence of the void space is likely unknown prior to the nondestructive evaluation. In another case, providing an assembled composite structure may comprise providing a composite structure with a known but not designed for void space. In other words, although the void space may have been detected during assembly of the composite structure, the composite structure was not designed to have the void space and assembly was completed anyway, perhaps in anticipation of remediating the composite structure using the systems and methods disclosed herein. Still further, in other cases, a composite structure may be provided that is less than fully assembled or completed, but wherein the degree of completion of the assembly makes conventional ways of accessing a void space inefficient or undesirably destructive. Once the assembled composite structure has been provided, the method 300 can progress to block 304.

Figure 7:
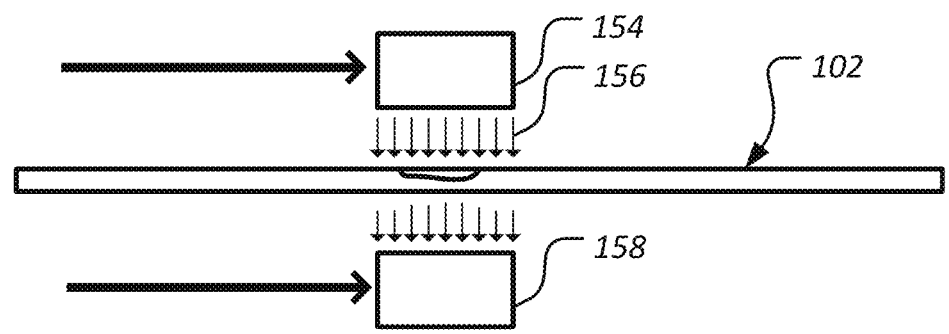
FIG. 7 is a schematic diagram of a system for conducting nondestructive evaluation of a composite structure for the purpose of identifying an undesirable void space.

At block 304, a nondestructive evaluation of the composite structure can be performed to identify and locate an existing undesirable void space. As shown in FIG. 7, a composite structure such as main rotor blade 104 can be imaged or otherwise evaluated using X-rays. FIG. 7 shows that an X-ray emitter 154 can emit X-ray radiation 156 in a direction toward an electronic X-ray receiver 158 (or alternatively, a chemically reactive film). With the main rotor blade 102 disposed in the path of the X-ray radiation 156, an amount of radiation that passes through the main rotor blade 120 is not uniform and can be interpreted as representing the approximate size and/or location of any undesired void space. The location and amplitude of the X-ray radiation received by the electronic X-ray receiver 158 can be communicated to a user by computer visualization, printed mappings, audible tones, or any other suitably reliable indicator. Depending on the manner in which the location of the void space is communicated, information regarding the location, size, and boundaries of the void space can be recorded either incrementally or simultaneously as a collective representation. In this embodiment, a void space 146 can reasonably be anticipated to have a gap of anywhere from about 0.04 inches to about 0.2 inches of separation between expanding adhesive 136 and forward interface profile 142 of honeycomb structure 134. Once the location, size, and/or void space have been determined, the method 300 can continue to block 306.

Figure 8:
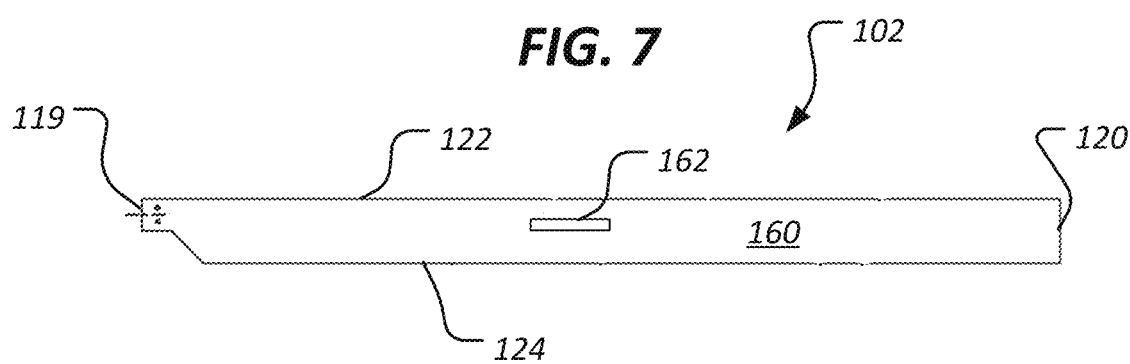
FIG. 8 is a top view of the main rotor blade of FIG. 2 with a void location marked on the main rotor blade.

At block 306, a top view representation of the void space is recorded on the outermost surface of main rotor blade 102. In this embodiment, as shown in FIG. 8, the outermost surface of main rotor blade 102 comprises paint 160. Accordingly, in this embodiment, a visual recordation 162 (preferably a visual depiction representative of the size, shape, and location) of the void space is made on the paint 160. In some cases, the visual recordation 162 can be closely matched to the actual dimensions and locations of the void space. However, in other embodiments such as shown in FIG. 8, the visual recordation 162 can comprise a generalized boundary intended not only to envelope the void space, but also to include a sufficient amount of adjacent honeycomb structure 134 as to be useful in imaging processes described below. The visual recordation 162 can be made manually, such as with a marker or pencil, or alternatively, by an automated process that utilized information generated by the electronic X-ray receiver 158. Regardless of the manner in which the visual recordation 162 is made, the effect is to provide visual guidance to relocating the void space found via the nondestructive evaluation of block 304. Once the visual recordation 162 is made, the method 300 may continue at block 308.

Figure 9:
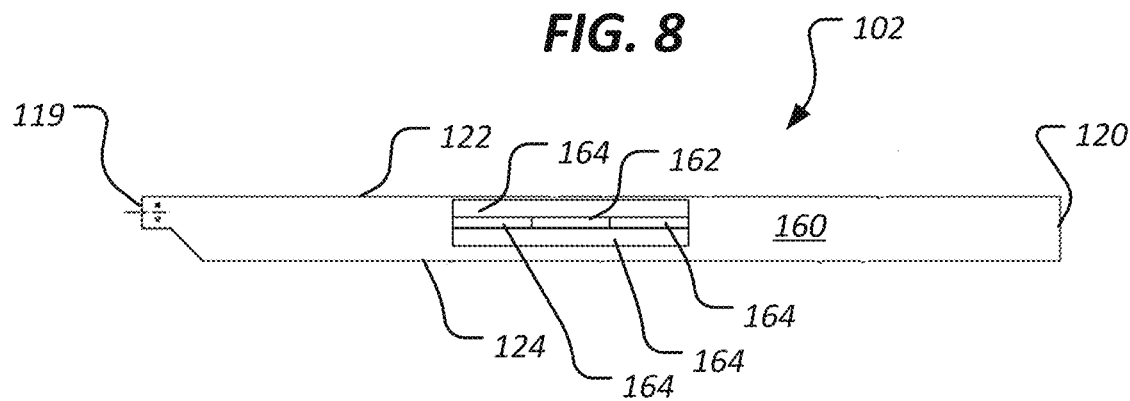
FIG. 9 is a top view of the main rotor blade of FIG. 8 with masking tape applied around the marked void location.

At block 308, the method 300 may continue by masking or otherwise applying a protective yet removable layer or coating to the areas of the paint 160 that directly surround the area denoted by visual recordation 162. In some embodiments, the masking can be achieved by applying strips of commercially available masking tape 164 as shown in FIG. 9. Once the masking has been accomplished, the method 300 may continue at block 310.

Figure 10:
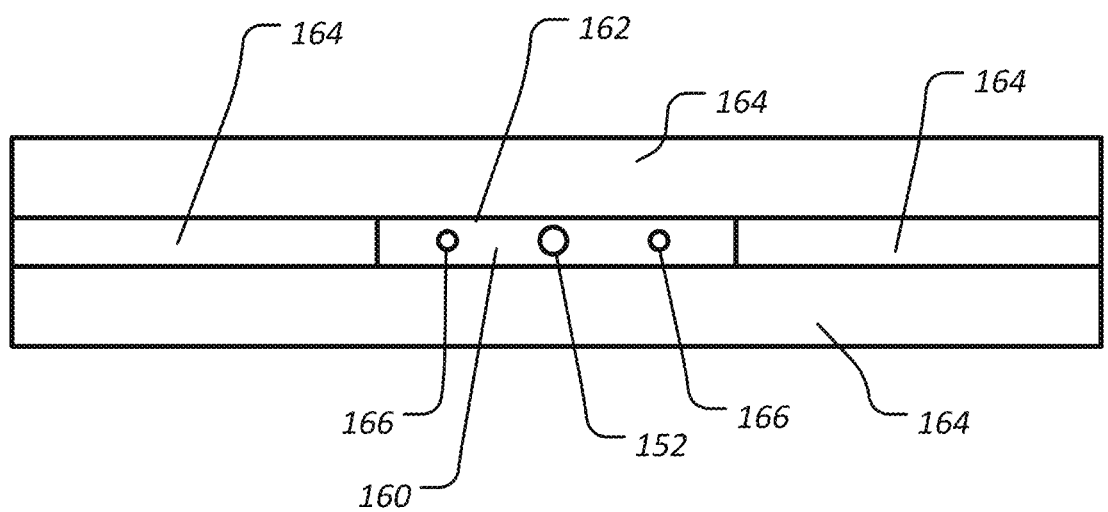
FIG. 10 is a partial top view of the main rotor blade of FIG. 9 with an injection hole and two relief holes drilled into the main rotor blade.

At block 310, the method 300 may continue by drilling at least an injection hole 152 through the paint 160 and upper skin 130 to form a passage between the void space 146 and the space exterior to the main rotor blade 102. The diameter of the injection hole 152 should be equal to or less than the maximum allowable diameter hole or defect prescribed as allowable to be repaired for the main rotor blade 102 without required the use of a skin patch. In other words, the injection hole 152 diameter should be chosen to be small enough to not require use of a skin patch for the repaired composite structure to be rightfully certified for being placed back into service. It will be appreciated that the maximum allowable diameter holes for some composite structures, such as fuselage composite structures, may allow for larger diameter holes, while other composite structures, such as tail rotor blades, may require smaller holes than a main rotor blade 102. In this embodiment, a hole size of 0.1 inches would, according to the appropriate structural repair manual, require use of a skin patch. Accordingly, in this embodiment, an injection hole 152 size of 0.09 inches is selected as an allowable hole size that does not require use of a skin patch. In some embodiments where the longitudinal length of the void space is determined to be about 6 inches or longer, two relief holes 166 through the paint 160 and upper skin 130 to form passages between the void space 146 and the space exterior to the main rotor blade 102. All injection holes 152 and relief holes 166 should be drilled substantially orthogonally relative to the skin. In some embodiments, the relief holes 166 are located about 0.25 inches away from the outermost lateral ends of the void space 146. FIG. 10 shows a schematic top view representation of an injection hole 152 and two smaller relief holes 166 having been drilled into the main rotor blade 102. In some cases where the injection hole diameter is about 0.09 inches, the associated relief holes may be about 0.07 inches in diameter or less. FIG. 11 shows a partial schematic cutaway side view of the main rotor blade 102 having an injection hole 152. Once the requisite holes have been drilled, method 300 may continue to block 312.

At block 312, the method 300 may continue by removing paint 160 from the areas indicated by the visual recordation 162. Further, paint 160 is removed from the opposing side of the main rotor blade 102 sufficient to allow an improved passage of light energy through the void space 146 and adjacent honeycomb structure 134 as will be described below. The paint 160 may be removed by commonly known abrasive or chemical techniques. FIG. 12 shows a partial schematic cutaway side view of the main rotor blade 102 having an injection hole 152 and the paint 160 removed from both the upper skin 130 and the lower skin 132 as described above. Once the paint 160 is removed, the method 300 can continue to block 314.

Figure 13:
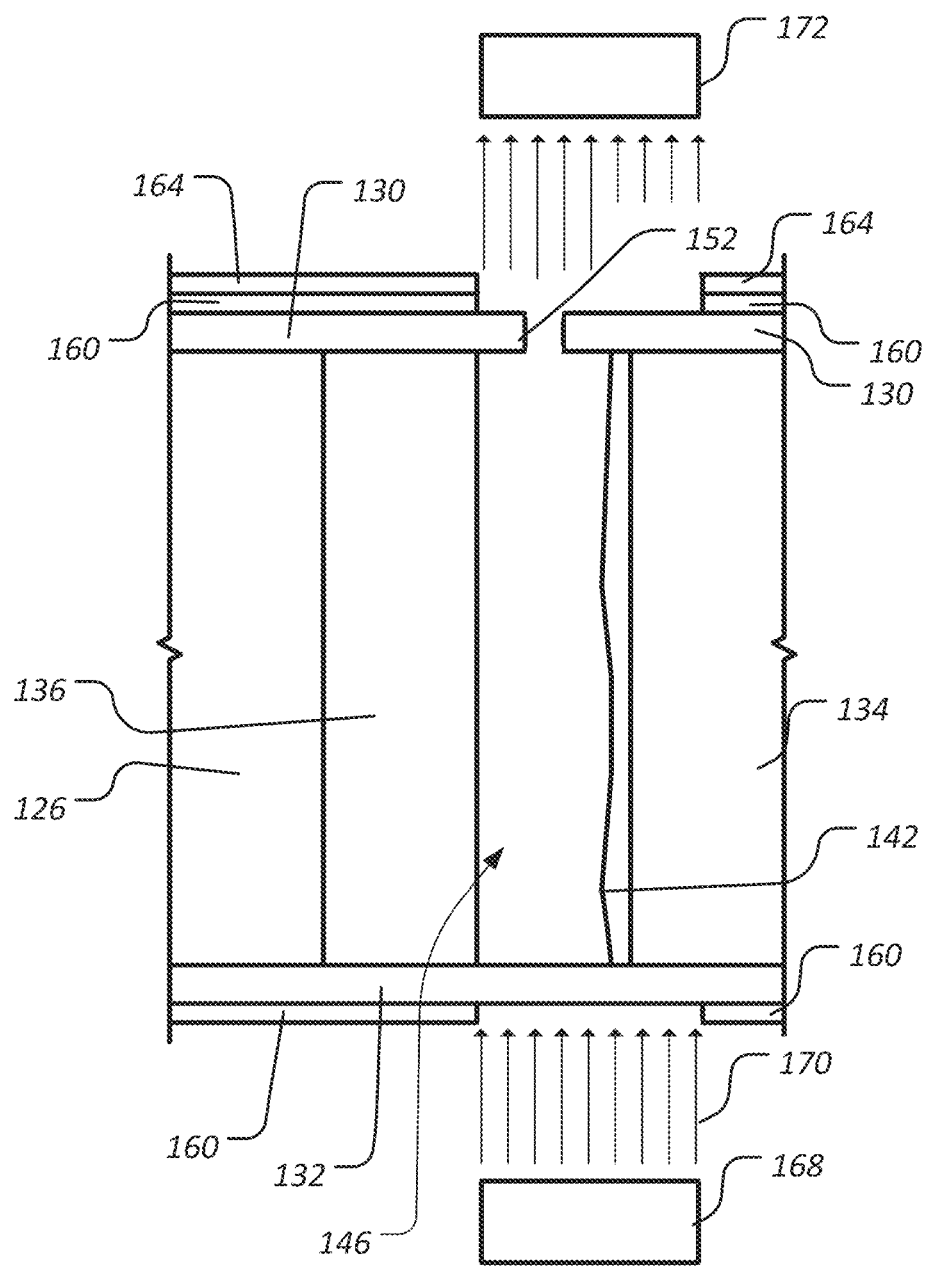
FIG. 13 is a schematic representation of a system for capturing visual images of how light travels through an unrepaired void space.
Figure 14:
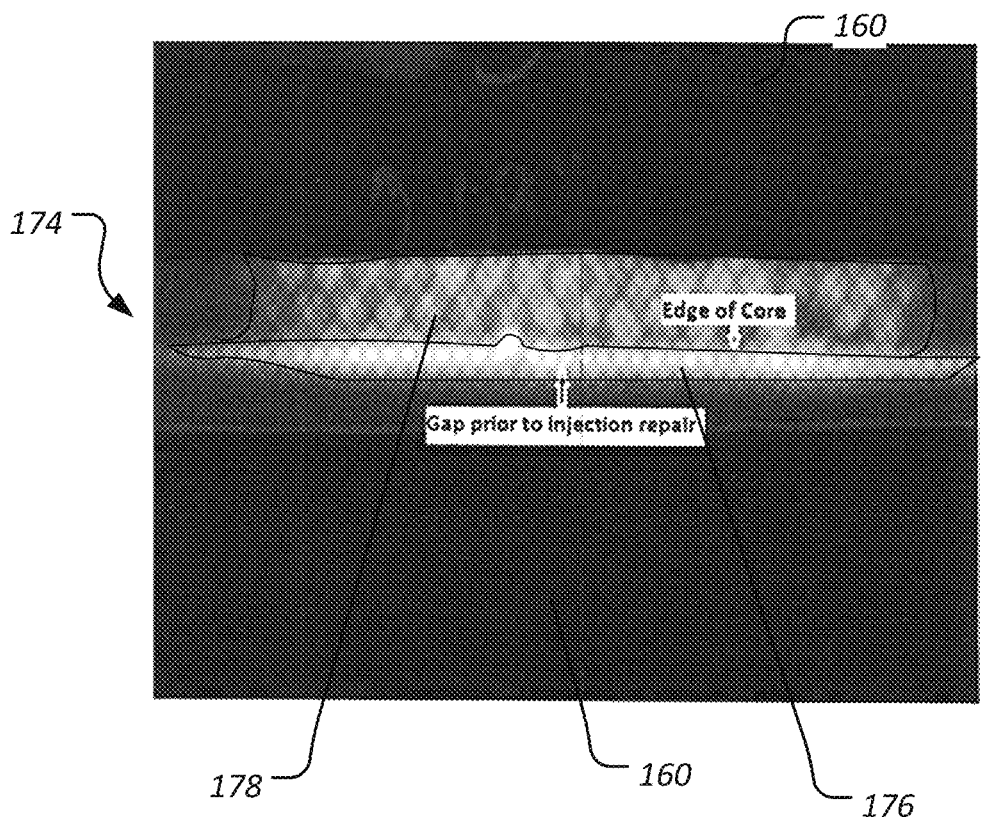
FIG. 14 is a sample captured visual image of an unrepaired void space.

At block 314, the method 300 may continue by conducting a pre-repair nondestructive imaging of the void space 146. In this embodiment, a bright light, such as a one million candlepower (or alternatively, 32,000 lumens) visible spectrum light source 168 is placed below the main rotor blade 102 generally centered along the area of removed paint 160 of the lower skin 132. Next, light 170 is emitted from the light source 168 and is passed through the void space 146 and the honeycomb structure 134. A camera 172 is placed above the upper skin 130 and is generally centered along the area of removed paint 160 of the upper skin 130 and is aimed to receive light that is transmitted through the main rotor blade 102. While the light source 168 is emitting light 170, the camera 172 is operated to capture a visual image 174 of the light that is transmitted through the main rotor blade 102. The visual image 174 can generally comprise a void zone 176 of brightest or highest intensity light that indicates where a void space 146 is likely to exist. The adjacent honeycomb zone 178 is generally relatively dimmer than the void zone 176. This visual image 174 can be saved for use in determining an effectiveness of the repair process by comparison to a later captured image. FIG. 13 shows a partial schematic cutaway side view of the main rotor blade 102 with the light source 168 and the camera located as described above to capture a visual image 174 prior to repairing the main rotor blade 102. FIG. 14 shows an example visual image 174 as described above. Once the visual image 174 is captured, the method 300 can continue to block 316.

Figure 15:
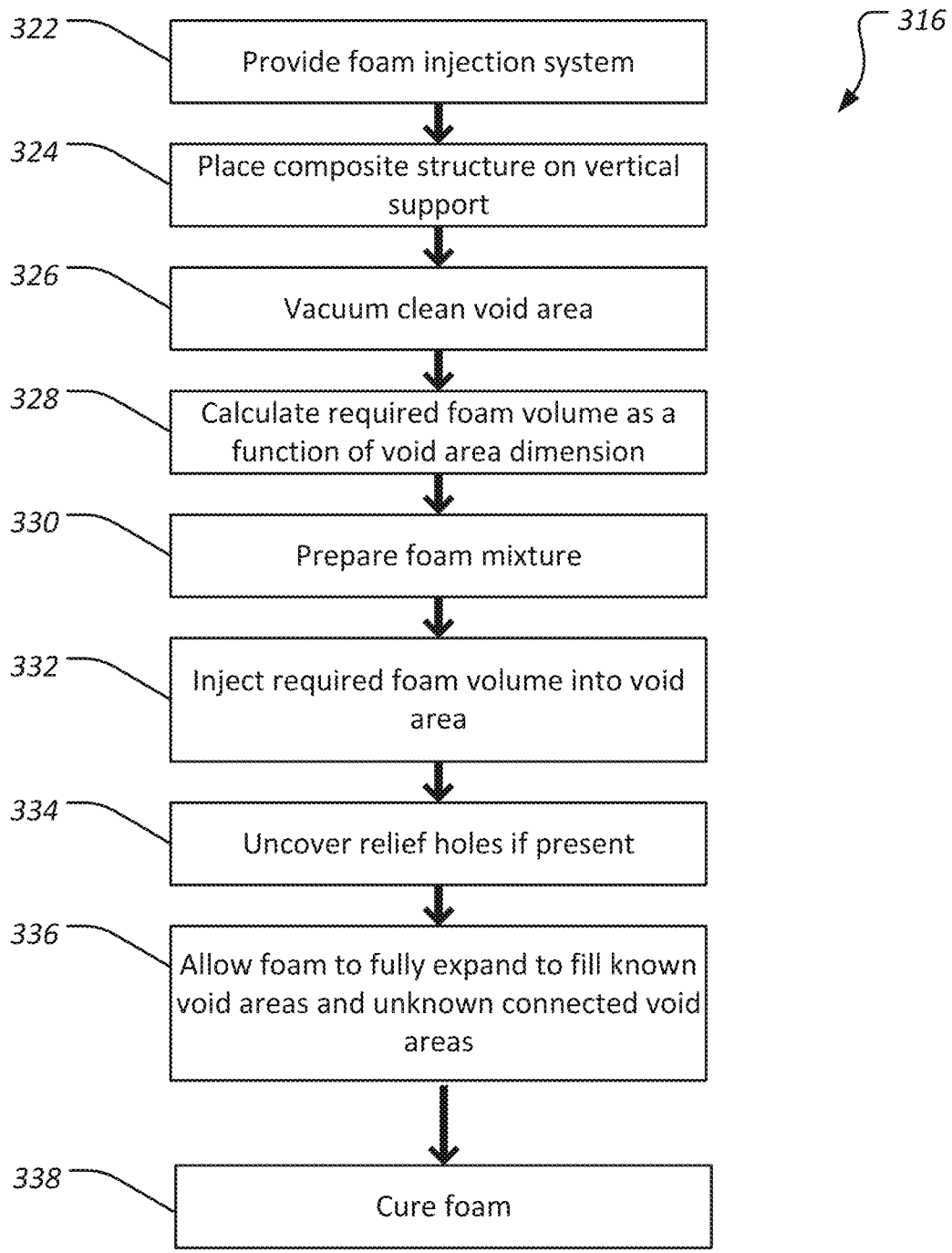
FIG. 15 is a flowchart showing multiple steps of a step of the flowchart of FIG. 6.
Figure 16:
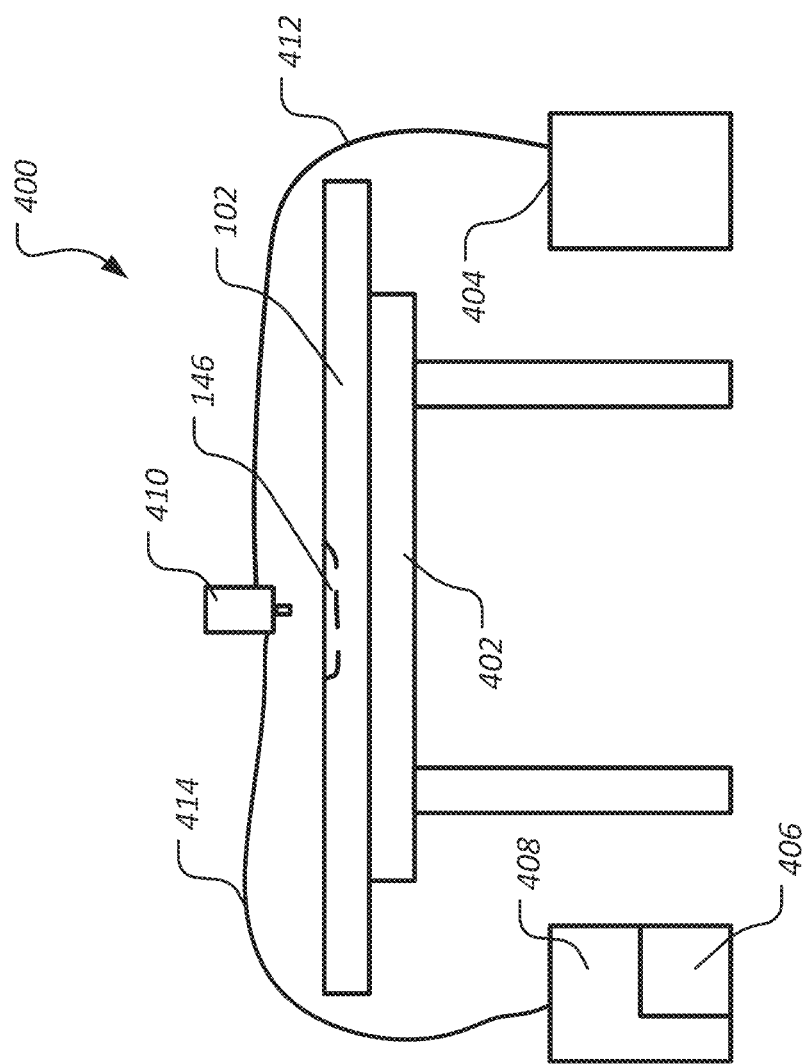
FIG. 16 is a schematic representation of a foam injection system.

At block 316, the method 300 may continue by performing a foam injection repair. Performing a foam injection repair comprises multiple actions that are shown in FIG. 15. Block 316 can begin at block 322 by providing a foam injection system 400 as shown in FIG. 16. The foam injection system 400 includes a vertical support 402 (such as a table) configured to support the main rotor blade 102 at a convenient working height, a foam supply 404, an air compressor 406, a compressed air storage tank 408, a foam injection nozzle 410, a foam supply conduit 412 connecting the foam supply 404 to the foam injection nozzle 410, and air supply conduit 414 connecting the compressed air storage tank 408 to the foam injection nozzle 410. In this embodiment, the foam supply 404 can comprise a bucket or other simple unpressurized container. In an alternative embodiment, an air gun with an associated cartridge filled with the required amount of foam may be utilized rather than foam injection nozzle 410 and associated foam supply 404. After providing the foam injection system 400, block 316 can continue to block 324.

At block 324, block 316 can continue by placing the composite structure, the rotor blade 102, on the vertical support 402, preferably with the injection hole 152 and any relief holes 166 facing upward.

Next, at block 326, block 316 can continue by vacuum cleaning any loose debris from the void space 146. In cases where there are no relief holes 166, a small vacuum nozzle can be inserted into the void space 146 through the injection hole 152. In cases where more than one hole is present, presenting suction to one or more of the holes 152, 166 without inserting anything into the void space 146 may be preferred.

Next, at block 328, bock 316 can continue by calculating a required foam volume as a function of one or more dimensions of the void space 146. In some cases, a void space 146 can be assumed to have assumed uniform depths and heights and only a measured longitudinal length is the variable of interest in determining the required foam volume. For example, for a given length of void space 146 a known volume of foam may be needed. In this embodiment, the required foam volume is associated with a corollary value of elapsed foam injection time where the volumetric rate of foam output from the injection nozzle 410 is known when foam injection nozzle 410 is operated at a known air pressure. In some cases, the foam injection nozzle 410 is supplied compressed air at about 90 psi. With such a known air pressure and a known volumetric rate of foam output at the known pressure, an effective estimate of foam volume can be simplified to simply choosing a period of foam injection time for the measured void space 146 length. In some embodiments, for example, a 3 inch long void space 146 may require only about 0.5 seconds of foam injection. Void spaces 146 with significantly longer lengths may require as long as about 2 seconds of foam injection. In alternative embodiments, a positive displacement pump may be used to introduce higher resolution or different metering of the amount of foam injected.

Figure 17:
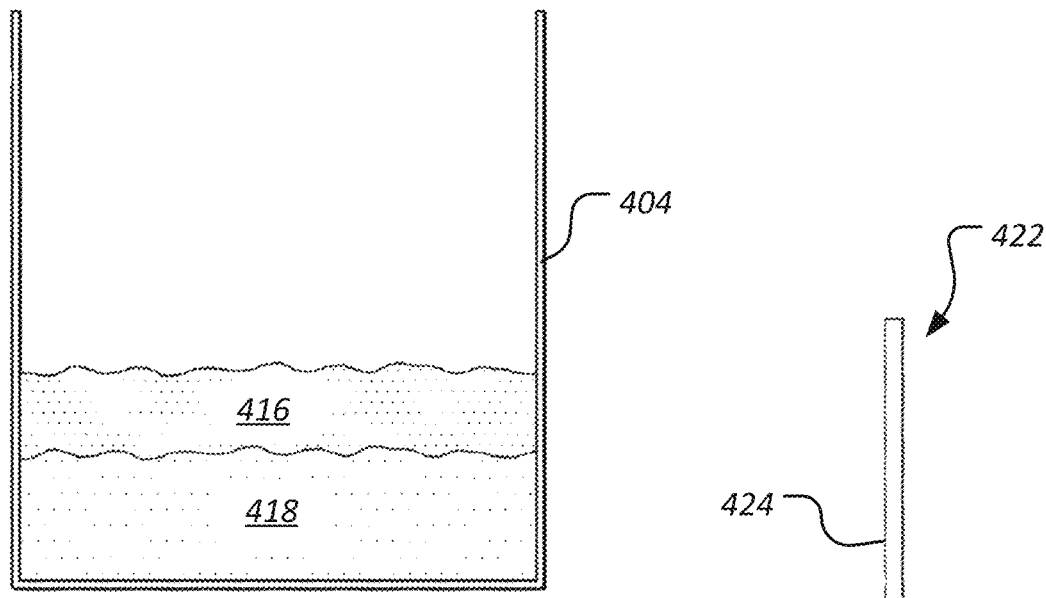
FIG. 17 is a schematic representation of the unmixed constituents of a foam system.
Figure 18:
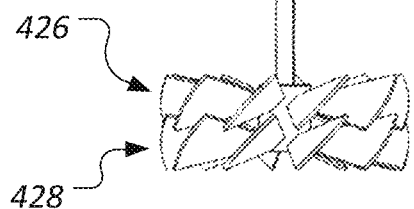
FIG. 18 is mixer for mixing the constituents of FIG. 17.
Figure 19:
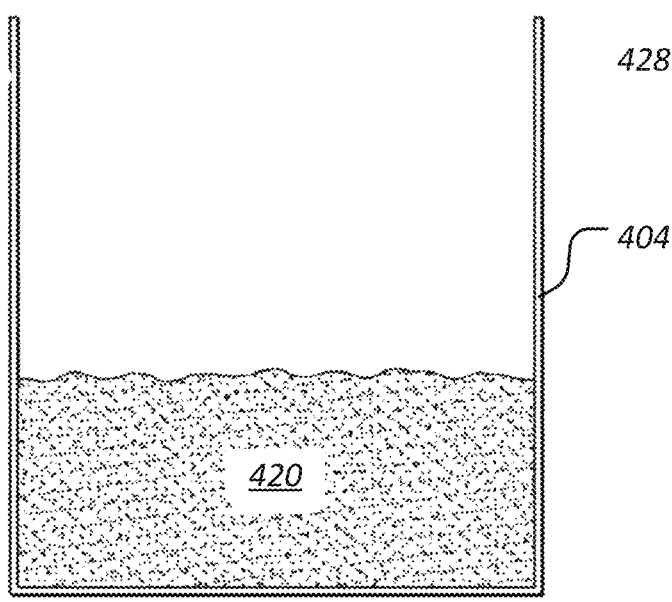
FIG. 19 is a schematic representation of a mixed foam ready for injection.

Next at block 330 and referring additionally to FIGS. 17-19, block 316 can continue by preparing a foam mixture. Preparing the foam mixture can comprise providing the two constituents of a polyurethane foam that is self-expanding based on a two-part chemical reaction (not aerobic reaction) with ambient temperature curing without the need for secondarily applied heat. Upon curing (sufficient passage of time), the foam is rigid while having a relatively low density. The preferred foam is a polyisocyanurate pour foam system marketed under the name of Stepanfoam BX 450, by the Stepan Chemical Company. It should be fully appreciated that other foams may be used. Stepanfoam BX 450 includes two separate resin components, namely a resin T (70% by weight) 418 and a resin R (30% by weight) 416. The desired weight amounts of resin T 418 and resin R 416 are measured and poured into foam supply 404. The resin T 418 and resin R 416 are mechanically agitated to form a homogenous mixture 420. A mixer 422 is used in rotation in order to mix resin T 418 and resin R 416 to form mixture 420. Mixer 422 includes a shaft 424, the shaft 424 being configured to be driven by a drill motor, or the like. Mixer 422 may include a plurality of blades located on a first blade disc 426 and a second blade disc 428. In some embodiments, mixer 422 is rotated at 3500 revolutions per minute for 10-15 seconds when mixing resin T 418 and resin R 418 to form mixture 420. Although the above embodiment is described as utilizing the Stepanfoam BX 450 foam, in alternative embodiments, any other suitable type of expanding foam may be utilized. In other embodiments, alternative foams can be utilized that expand faster or slower than the Stepanfoam BX 450, are heavier or lighter than the Stepanfoam BX450, or have other characteristic differences relative to Stepanfoam BX 450 without substantially changing the manner in which the foam is introduced to a void space and without substantially changing the effect of allowing the foam to expand and cure within the void space.

Next at block 332, block 316 can continue by injecting foam mixture 420 into void space 146 through injection hole 152. In some cases, the foam mixture 420 must be injected within about 15-30 seconds of having been completely mixed. In cases where relief holes 166 are not provided, a prescribed volume of foam mixture 420 can be injected by injecting foam mixture 420 for a prescribed period of time or by incrementally injecting known amounts of foam mixture 420 (such as by using a positive displacement pump). In some cases, once the required amount of foam mixture 420 is injected, the injection hole 152 may be covered (using a plug or finger) to provide force for the foam to fill the void space 146 while traveling the length of the void space 146. In cases where relief holes 166 are provided, either the time or metering methods above can be used, or alternatively, foam mixture 420 may be injected until foam mixture 420 reaches one or more of the relief holes 166. In all cases, the relief holes 166 remain closed using plugs (whether separate devices or fingers of an operator) until the foam mixture 420 reaches one or more of the relief holes 166. Maintaining the closed relief holes 166 helps to ensure that the foam mixture 420 remains under a known pressure while being injected and allows an opportunity for a more uniform foam density throughout the length of the foam filled void space 146.

Next at block 334, block 316 can continue by fully uncovering any provided relief holes 166 as mentioned above. With the relief holes 166 uncovered, the foam mixture 420 can expand a rate unimpeded by a pressure blockage. As the foam expands, it can not only fill the known void space 146, but can also self-route to unknown or undetected void spaces that are connected by small passages. In this manner, the solution of filling a void space 146 with expanding foam is, in some embodiments, more robust than can be estimated by the above-described imaging of the void space 146. Any foam mixture 420 that is not accepted into void space is ultimately ejected out of holes 152, 166 so that the extraneous foam mixture 420 is in contact with the upper skin 130, paint 160, and masking tape 164. By allowing the excess foam mixture 420 to exit through the holes 152, 166, undesirable pressure buildup is also prevented. Undesirable pressure buildup can lead to undesirable increases or inconsistencies in foam density and may apply sufficient pressure to the honeycomb structure 134, upper skin 130, and lower skin 132 to separate the honeycomb structure 134 from either of the skins 130, 132 or the expanding adhesive 136.

Figure 20:
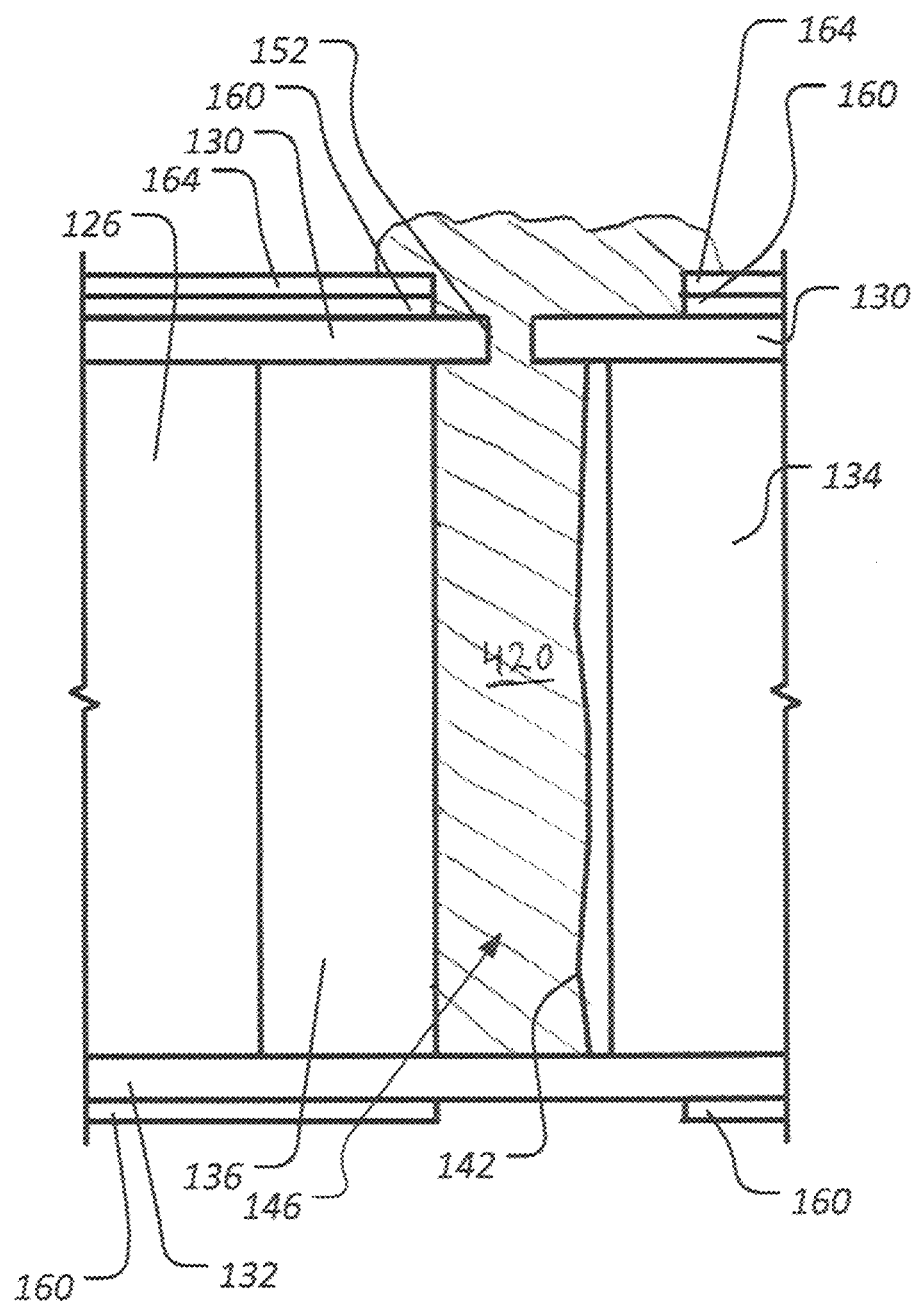
FIG. 20 is a schematic partial cutaway view of the unrepaired main rotor blade showing foam mixture injected into the void space.

Next at block 336, block 316 can continue by simply allowing passage of time sufficient to allow full expansion of the foam mixture 420. The expansion rate of the foam mixture 420 is a known rate specified by the manufacturer of the foam system. Once the injected foam mixture 420 has fully expanded or reacted, clearly copious amounts of expanded foam can be removed from the masking tape 164 and some of the expanded foam mixture 420 can be removed from above the paint 160 level associated with the upper skin 130 while leaving at least a slight bump of expanded foam mixture 420 extending from the holes 152, 166 as shown in FIG. 20.

Figure 21:
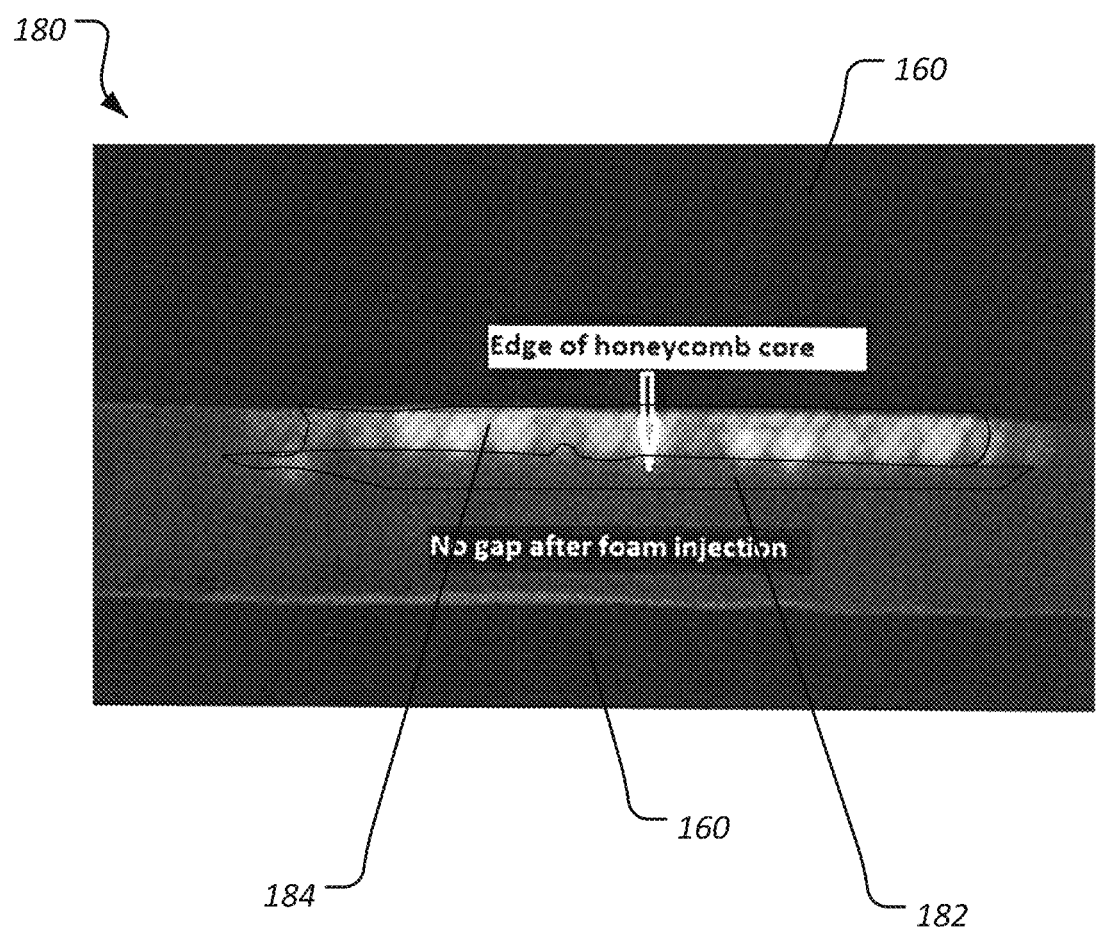
FIG. 21 is a sample captured visual image of a repaired void space.

Next at block 338, block 316 can continue by simply allowing passage of time sufficient to allow full curing of the foam mixture 420. The curing rate of the foam mixture 420 is a known rate specified by the manufacturer of the foam system. Total curing time may be between about 15 to about 20 minutes. Once the foam mixture 420 is completely cured, the foam mixture 420 is hard and machinable. The bump of expanded foam mixture 420 can be cut, ground, or otherwise machined to conform to the general profile of the upper skin 130 as shown in FIG. 21. Once the foam mixture 420 is completely cured, the method 300 can progress from block 316 to block 318.

At block 318, the method 300 may continue by conducting a post-repair nondestructive imaging of the void space 146 in substantially the same manner the pre-repair nondestructive imaging is described as being conducted with regard to block 314. The post-repair nondestructive imaging of the void space 146 is shown in FIG. 20. The post-repair nondestructive imaging of the void space 146 results in a captured visual image 180 comprising void zone 182 and an adjacent honeycomb zone 184. The post-repair captured visual image 180 is shown in FIG. 21. Comparing the post-repair captured visual image 180 to the pre-repair captured visual image 174, the void zone 182 is now much dimmer if not fully opaque as compared to the void zone 176, a result of less light passing through the void space 146. However, the honeycomb zone 184 is substantially the same brightness as the honeycomb zone 178, indicating no change in material content of the honeycomb structure 134. With the void space 146 being confirmed as having been filled completely with cured expanded foam mixture 420, the method 300 can progress to block 320.

Figure 22:
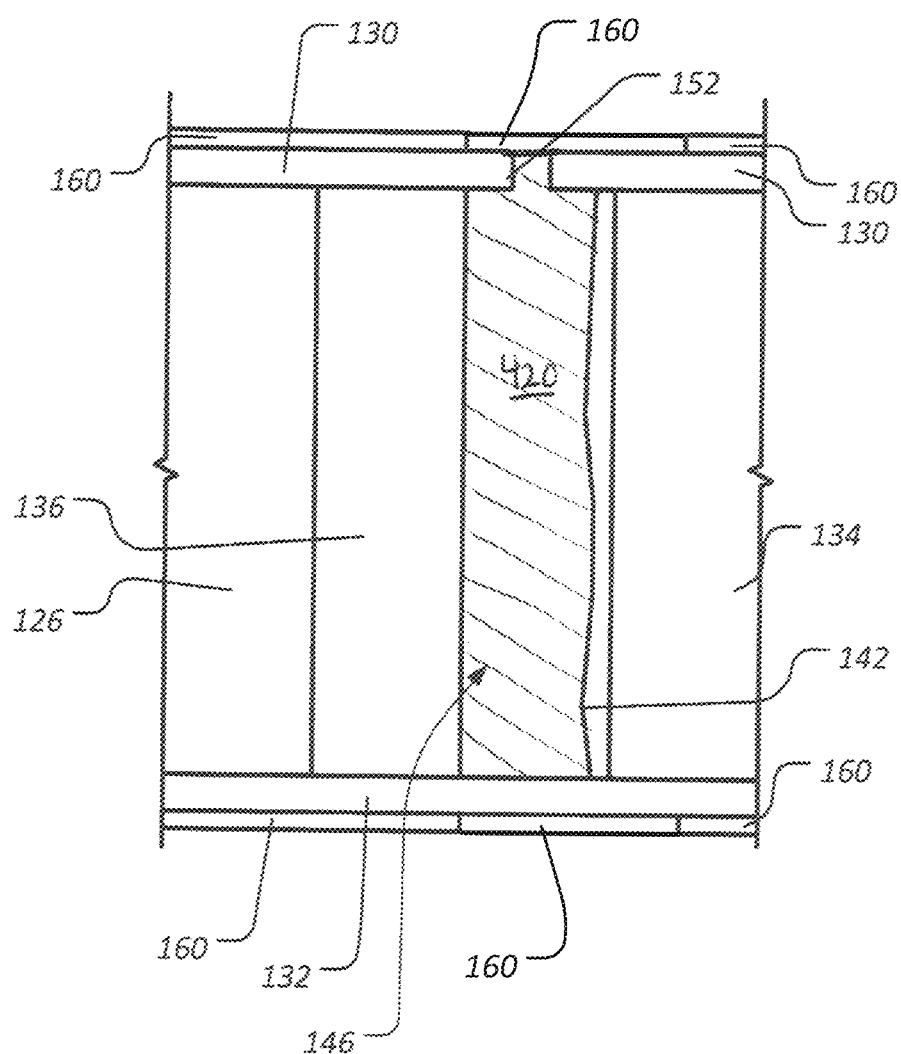
FIG. 22 is a schematic partial cutaway view of a repaired main rotor blade.

At block 320, the method 300 may continue by repairing the paint 160 back to a uniform finish. In other words, sanding and/or chemical preparation of the existing paint 160 can be performed and made ready to accept new paint 160. New paint 160 can then be applied to return the outermost surface of the rotor blade 102 to a smooth continuously painted surface and all masking tape 164 can be removed as shown in FIG. 22. With the paint 160 fully repaired, the main rotor blade 102 can be mechanically tested or put directly into service again.

In some cases, such as for the case of rotor blades, weight and balance of a repaired rotor blade are important so that low weight and minimal impact to designed balance is desirable. By managing the foam injection and expansion process to minimize density gradients of cured foam, weight and balance impact can be minimized. In some cases, multiple injection holes may be utilized for a single void space. In some cases, a single composite component can comprise multiple unconnected void spaces and the methods disclosed herein can be applied multiple times to achieve repair of the composite structure by filling multiple disconnected void spaces sequentially or simultaneously. In alternative embodiments, thermography and/or ultrasonic systems and methods may be used in addition to or instead of the X-ray and visible light imaging systems described above. While the embodiments described above in great detail discuss drilling through upper skins, in alternative embodiments, void spaces can be made accessible by drilling through any other skin or enclosing material. Further, while relief holes are described as being drilled through the same skins as related injection holes, injection holes and relief holes associated with a void space can be provided through any skin or enclosing material and need not be on the same sides of a composite structure. In some cases, imaging markers such as X-ray opaque material or radioactive material may be mixed with the foam to enable different nondestructive evaluation capabilities.

In alternative embodiments, the skins and/or honeycomb structure of composite structures to be repaired may be formed of metal. In such cases, the methods disclosed herein, with the exception of some of the nondestructive evaluations relying on light being passed through the skins and/or honeycomb structures, can be utilized in substantially the same manner as in cases where the skins and/or honeycomb structures are constructed of materials that are relatively more light permeable.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of repairing a composite structure, comprising:
   providing an assembled composite structure comprising a first outer component, a second outer component, and a void space between the first outer component and the second outer component;
   forming an injection hole through the first outer component to provide a path between the void space and space external to the composite structure;
   injecting foam into the void space through the injection hole while the foam is in a substantially unexpanded state; and
   expanding the foam within the void space, wherein upon expansion, the foam contacts an expanded adhesive that is disposed between a spar and the void space.

2. The method of claim 1, wherein the composite structure comprises a rotor blade.

3. The method of claim 2, wherein the void space is disposed between the spar of the rotor blade and a honeycomb structure of the rotor blade.

4. The method of claim 2, wherein the first outer component comprises a skin of the rotor blade.

5. The method of claim 1, further comprising:
   prior to forming the injection hole, performing a nondestructive evaluation of the composite structure to identify the void space.

6. The method of claim 5, further comprising:
   applying masking tape to the composite structure around an area of the first outer component identified as being associated with the identified void space.

7. The method of claim 6, wherein the forming the injection hole is conducted after applying the masking tape.

8. The method of claim 7, further comprising:
   vacuum cleaning the void space.

9. The method of claim 8, further comprising:
   removing paint from the area of the first outer component.

10. The method of claim 9, further comprising:
    passing light through the composite component along a path through the second outer component, the void space, and the injection hole; and
    capturing an image of the light passed through the composite component before injecting the foam.

11. The method of claim 10, further comprising:
    capturing an image of light passed through the injected foam after the foam is injected and expanded.

12. The method of claim 1, further comprising:
    forming a relief hole through at least one of the first outer component and the second outer component.

13. The method of claim 12, wherein the relief hole is obstructed while the foam is injected.

14. The method of claim 13, wherein the relief hole is unobstructed after the foam is injected.

15. The method of claim 12, wherein the foam is allowed to expand within the void space and excess expanded foam is allowed to exit the void space via at least one of the injection hole and the relief hole.

16. The method of claim 1, wherein at least a portion of the foam expands and exits the void space via the injection hole, wherein the foam cures after passage of time, and wherein the expanded and cured foam is machined to provide a surface profile substantially continuous with a profile of at least one of the first outer component and the second outer component.

17. The method of claim 16, further comprising:
    replacing paint removed from the first outer component.

18. The method of claim 1:
    wherein the composite structure has a repair specification requirement that when the first outer component comprises a damage hole having a given minimum damage hole diameter, a patch of material other than foam or paint is required to cover the damage hole;
    wherein the injection hole has a diameter smaller than the minimum damage hole diameter so that no patch comprising materials other than the foam and paint is required to cover the injection hole; and
    wherein the method further comprises measuring the damage hole diameter and determining, as a function of the damage hole diameter, whether a patch comprising material other than the foam or paint is required.

19. The method of claim 18, further comprising:
    providing a relief hole comprising a diameter smaller than the diameter of the injection hole.

20. A method of repairing a rotor blade, comprising:
    providing a rotor blade comprising a void space between a spar of the rotor blade and a honeycomb structure of the rotor blade, the void space extending from an upper skin of the rotor blade to a lower skin of the rotor blade;
    forming an injection hole through at least one of the upper skin and the lower skin; and
    injecting foam into the void space via the injection hole;
    wherein an expanded adhesive is disposed between the spar and the void space.

21. A method of repairing a composite structure, comprising:
    providing an assembled composite structure comprising a first outer component, a second outer component, and a void space between the first outer component and the second outer component;
    forming an injection hole through the first outer component to provide a path between the void space and space external to the composite structure;

injecting foam into the void space through the injection hole while the foam is in a substantially unexpanded state;

expanding the foam within the void space, wherein upon expansion, the foam at least one of (1) contacts an innermost wall of at least one of the first outer component and second outer component and (2) contacts an expanded adhesive that is disposed between a spar and the void space;

prior to forming the injection hole, performing a nondestructive evaluation of the composite structure to identify the void space;

applying masking tape to the composite structure around an area of the first outer component identified as being associated with the identified void space;

vacuum cleaning the void space; and removing paint from the area of the first outer component;

wherein the forming the injection hole is conducted after applying the masking tape.

\* \* \* \* \*